Feb. 22, 1966    L. BROCKMAN    3,236,247
DENTAL STRING OR FLOSS HOLDER WITH MEANS FOR
ADJUSTING STRING OR FLOSS TENSION
Filed Dec. 11, 1963
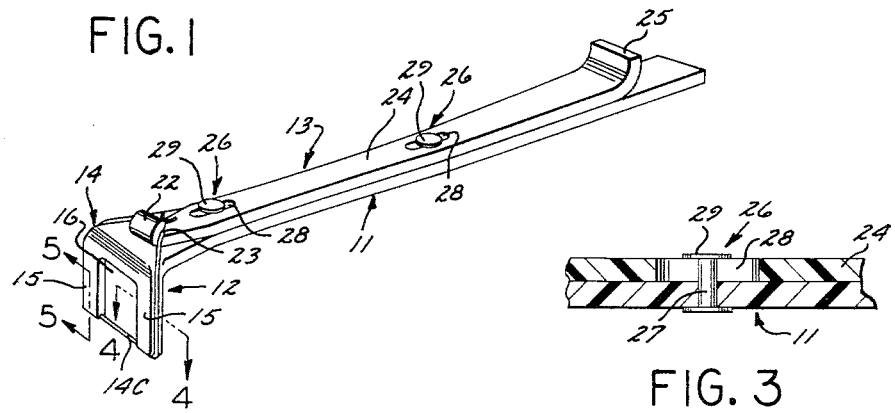
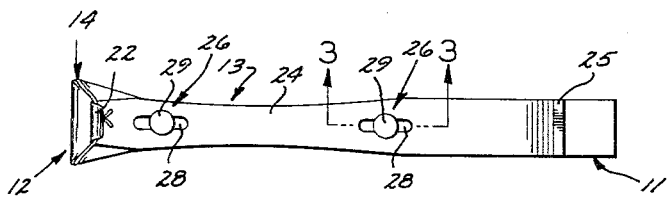
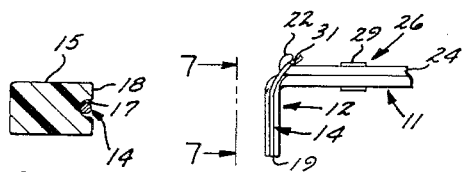
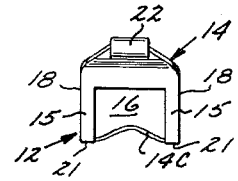
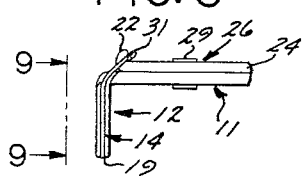
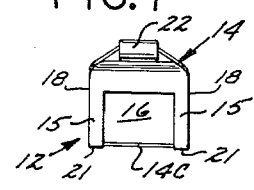
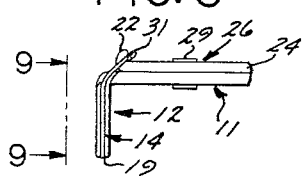
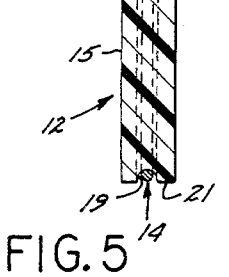
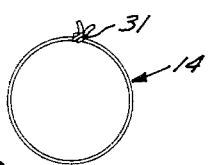
INVENTOR.
LEONARD BROCKMAN

United States Patent Office 3,236,247
Patented Feb. 22, 1966

3,236,247
DENTAL STRING OR FLOSS HOLDER WITH MEANS FOR ADJUSTING STRING OR FLOSS TENSION
Leonard Brockman, Los Angeles, Calif.
(435 N. Bedford Drive, Room 105, Beverly Hills, Calif.)
Filed Dec. 11, 1963, Ser. No. 329,844
4 Claims. (Cl. 132—91)

Generally speaking, the present invention relates to the tooth cleaning art and, more particularly, pertains to a dental or tooth cleaning instrument adapted to mount a short closed tensile member loop of dental string or dental floss in a position for effective use in forcing same between adjacent teeth for removal of food particle debris therefrom and any other undesired material therefrom and also for scraping any scum or other undesired material from surfaces of the teeth. In other words, the device is intended for general oral prophylactic purposes and is adapted for the above-indicated type of tooth cleaning operation in a manner superior to that which can be attained through the use of conventional toothbrushes and the like since toothbrushes can normally not penetrate into small crevices or very narrow spaces between adjacent teeth in the advantageous manner of dental string or dental floss.

I am aware of the fact that dental string or dental floss has been employed in the past for such tooth cleaning and oral prophylactic purposes. However, in such prior art use of dental string or dental floss, the commonest mode of using same has been to grasp a length of dental string or dental floss at longitudinally spaced locations between different fingers and to then tension the portion of dental string or dental floss therebetween and to place the tensioned portion thereof in the mouth and to force same between adjacent teeth which are to be cleaned. This is a relatively awkward procedure since it requires that the fingers holding one end of the piece of tensioned dental string or dental floss be placed in the person's mouth during the cleaning operation, which is extremely inconvenient and unsanitary.

I am also aware of the fact that certain prior art dental floss holders have been developed in an attempt to overcome the above-mentioned disadvantages of *direct* digital application and use of dental floss or string. However, most dental floss holders known to me have various disadvantages of one kind or another, one of the main disadvantages being the fact that most of them do not provide a simple and effective arrangement for mounting the dental string in a manner such that the tension of the cleaning portion can be controlled at will, which is quite necessary if an effective tooth cleaning operation is to be performed since a slack cleaning portion cannot readily be forced between the teeth, reciprocated, and/or removed therefrom in an optimum cleaning manner and also without the likelihood of being accidentally dislodged from the apparatus holding same. This problem has been complicated in the past because of the fact that even though such a prior art dental string or floss holder is arranged to initially properly tension the cleaning portion of a length of dental string or floss, after it is inserted into the mouth and a tooth cleaning operation is begun, the dental string or floss becomes moistened and this leads to stretching and to slackness or looseness of the cleaning portion of the dental string or floss, with all of the above-indicated disadvantages thereof.

Additionally, it should be noted that prior art dental string or floss holders known to me are of relatively complex or difficult-to-use construction and, in certain cases, have a structure such as to make it very difficult to mount the dental string or floss thereon, all of these disadvantages resulting in a very limited use of such prior art dental string or floss holders.

With the above points in mind, it is an object of the present invention to provide a very novel and simple, tooth cleaning instrument adapted to mount a short closed tensile member loop of dental string or dental floss in a very simple and easy-to-mount manner and in a position ideally adapted for effective use in forcing same between adjacent teeth for removal of food particle debris therefrom, and which is provided with a very novel, simple, and extremely easy-to-operate tension adjustment means which will control the tension of the tooth cleaning portion of the tensile member loop of dental string or dental floss while it is in use during a tooth cleaning operation— said tension adjustment means being adapted to be operated by a single digital member of the hand of a person holding the novel tooth cleaning instrument of the present invention, in a manner which does not inconvenience the person whatsoever or in any way interfere with the holding of the instrument and the desired movement of same relative to the person's teeth during a tooth cleaning operation. In other words, the apparatus is ideally arranged for tooth cleaning purposes and for properly maintaining tension on the tooth cleaning portion of the dental string or dental floss during the tooth cleaning operation and to do so in a device of extremely simple and easy-to-operate construction.

It is a further object of the present invention to provide a novel tooth cleaning instrument of the type referred to above, considered per se, or by itself, as a holder for a short closed tensile member loop of dental string or dental floss, not positively included as part of the invention combination, but adapted to be supplied in volume whereby to make it possible to use a fresh loop of dental string or dental floss when desired for sanitary purposes.

It is a further object of the present invention to provide a novel tooth cleaning instrument of the character referred to hereinbefore, comprising both the instrument and a short closed tensile member loop of dental string or dental floss in combination.

It is a further object of the present invention to provide a novel tooth cleaning instrument of the type referred to hereinbefore which is made of a material capable of being repeatedly sterilized without damage, such as by heat or other suitable sterilization means. In certain forms of the invention, said material may comprise a lightweight, inexpensive, moldable plastic material of a sterilization-damage-resistant type.

It is a further object of the present invention to provide apparatus of the character referred to hereinbefore, embodying any or all of the features referred to hereinbefore, either generically or specifically, and either individually or in combination, and which is of relatively simple, inexpensive, lightweight, easy-to-use, easy-to-clean and/or sterilize, and easy-to-manufacture construction such as to facilitate the widespread or mass manufacture, distribution, and use of the device.

Further objects are implicit in the detailed description which follows hereinafter (which is to be construed as exemplary only, and not as specifically limiting the invention), and said objects will be apparent to persons skilled in the art after a careful study of the detailed description which follows hereinafter.

For the purpose of clarifying the nature of the present invention, one exemplary embodiment of the invention is illustrated in the hereinbelow-described figures of the accompanying single drawing sheet and is described in detail hereinafter.

FIG. 1 is a perspective view of one exemplary embodiment of the tooth cleaning instrument of the present invention showing it in a normal dental string or dental floss mounting relationship.

FIG. 2 is a slightly smaller scale top plan view of the instrument of FIG. 1.

FIG. 3 is an enlarged, fragmentary, sectional view taken in the direction of the arrows 3—3 of FIG. 2 and illustrates a typical one of the two pin-in-slot longitudinal slidable mounting means mounting the longitudinal slide member comprising the dental string tension adjustment means.

FIG. 4 is an enlarged, fragmentary, sectional view taken in the direction of the arrows 4—4 of FIG. 1 and illustrates a typical portion of the inwardly grooved transversely directed guide channel means along the outer edges of each of the two spaced fingers of the bifurcated yoke means.

FIG. 5 is an enlarged fragmentary sectional view taken in the direction of the arrows 5—5 of FIG. 1 and illustrates a typical portion of the rearwardly grooved inwardly directed guide channel means along the front or end edges of each of the two spaced fingers of the bifurcated yoke means.

FIG. 6 is a fragmentary side elevational view of the front end portion of the instrument drawn to substantially the same scale as FIG. 2. This view is for the purpose of illustrating the instrument when the tooth cleaning portion of the dental string or floss has become somewhat too loose or too slack, either through lack of proper initial tensioning thereof or through stretching thereof as a result of moisture or the like, even though it initially had been properly tensioned.

FIG. 7 is a front elevational view of the instrument, taken in the direction of the arrows 7—7 of FIG. 6, and clearly illustrates the above-mentioned slackness or looseness of the tooth cleaning portion of the dental string or floss.

FIG. 8 is a fragmentary side elevational view of the front portion of the instrument similar to FIG. 6 except that the tension adjustment means is shown in an adjusted position relative to that of FIG. 6 for the purpose of taking up the undesired slack of the front tooth cleaning portion of the dental floss or string and for properly tensioning same for optimum tooth cleaning use.

FIG. 9 is a front elevational view of the instrument, taken in the direction of the arrows 9—9 of FIG. 8, and clearly illustrates the fact that the operation of the tension adjustment means, as shown in FIG. 8, has taken up the undesired slack of the front tooth cleaning portion of the dental string or floss, as shown in FIG. 7, and has properly tensioned same for optimum tooth cleaning use.

FIG. 10 is an elevational view illustrating an exemplary short closed tensile member loop of dental string or dental floss adapted to be mounted, held, and placed in operative use by the novel tooth cleaning instrument of the present invention in the manner shown in FIGS. 1–9.

Referring to the figures for exemplary purposes, one illustrative embodiment of the invention is shown as comprising a longitudinal handle member, indicated generally at 11, which is provided with a substantially transversely directed bifurcated yoke means, such as indicated generally at 12, at one end thereof, and with said longitudinal handle member also being provided with tension adjustment means, indicated generally at 13, for manually or digitally adjusting the tension of an entire short closed tensile member loop of dental string or dental floss, as indicated generally at 14, and in particular for adjusting the tension of a forward or front tooth cleaning portion thereof as indicated at 14C.

In the exemplary form of the invention illustrated, the above-mentioned handle member 11 takes the form of a longitudinal handle member preferably made of plastic material, although not specifically so limited in all forms of the invention, and integrally carrying the above-mentioned transversely directed bifurcated yoke means 12 at the front end thereof and with said bifurcated yoke means 12 comprising a pair of substantially transversely directed fingers 15 spaced apart by an opening 16 in a direction substantially perpendicular to the transverse length direction of said fingers 15 whereby to cause said transversely directed bifurcated yoke means 12 to be of substantially U-shaped construction (actually of inverted U-shaped construction when in the position shown in FIGS. 1, 7, and 9).

In the exemplary form of the invention illustrated, each of said transversely directed fingers 15 is provided with inwardly grooved, transversely directed guide channel means, such as shown at 17 in FIGS. 4 and 5, extending along the transverse lengths of the outer edges 18 of said fingers 15 and communicating with laterally aligned, rearwardly grooved, inwardly directed guide channel means, such as shown at 19 in FIGS. 5, 6, and 8, extending along the front end edges 21 of each of said laterally spaced fingers 15.

The above-mentioned communicating guide channel means 17 and 19 are adapted to receive therein corresponding portions of the previously mentioned short closed tensile member loop of dental string or floss 14, as is clearly shown in all of FIGS. 1, 2, and 4–9, with the previously mentioned forward or front tooth cleaning portion 14C thereof lying across the forward or front edge of the opening 16 in a position for effectively using same for tooth cleaning purposes by forcing same between adjacent teeth to dislodge food particle debris and/or by drawing same over the surface of the teeth for removing scum or the like adhering thereto.

The rear portion of the tensile member loop of dental string or dental floss 14 is adapted to be hooked or looped over a forward engagement hook means 22 of the tension adjustment means 13 as indicated at 23.

In the exemplary form of the invention illustrated, the tension adjustment means 13 comprises a longitudinal slide member 24 which may be made of plastic material similar to the handle 11, although not specifically so limited in all forms of the invention, and which carries said previously mentioned engagement hook means 22 at the forward end thereof for engaging the rear portion 23 of the tensile member loop 14 of dental string or dental floss and which has a manually or digitally engageable projection 25 at the rear end thereof for slidable operation of the tension adjustment means 13 for tightening the tension on the forward or front tooth cleaning portion 14C of the tensile member loop of dental string or floss 14.

It will be noted that, in the exemplary form of the invention illustrated, the longitudinal slide member 24 is slidably mounted with respect to the longitudinal handle member 11 by the pair of pin-in-slot slidable mounting means, indicated generally at 26, and an exemplary one of which is illustrated in detail in FIG. 3, wherein it is shown as taking a specific form wherein said pin comprises a rivet 27 rigidly fastened to the handle member 11 and extending upwardly through a narrow longitudinal slot 28 formed by surrounding slot-defining portions of the slide member 24, and with each of said rivets 27 having enlarged top heads 29 wider than the slots 28 in the slide member 24. This provides an arrangement which allows the longitudinal slide member 24 to be longitudinally moved in either direction to an extent determined by the length of the slots 28, while otherwise positively retaining the slide member 24 with respect to the handle member 11.

The structure is such that the longitudinal slidable movement of the slide member 24 can be effected by merely applying finger or thumb pressure to the projection 25 of the slide member 24 while the entire instrument is actually being used for tooth cleaning purposes, thus making it possible to provide the proper tension to the forward or front tooth cleaning portion 14C of the dental string loop 14 so as to optimize the tooth cleaning operation and to overcome the hereinbefore-mentioned prior art disadvantages.

It will be noted that the above-mentioned important tension adjustment feature and the advantages thereof are clearly illustrated in the sequence of figures shown in FIGS. 6–9; FIGS. 6 and 7 showing the device with a slack forward or front dental string cleaning portion 14C, and FIGS. 8 and 9 showing the device after the tension adjustment means 13 has been digitally operated to a degree such as to take up the slack or completely tighten the forward or front tooth cleaning portion 14C of the dental string loop 14.

Normally, a plurality of dental string loops would be packaged and sold as replacement items for use as desired to replace previously used dental string loops, thus providing a highly sanitary arrangement—particularly in view of the fact that in the preferred form of the invention, the entire instrument is preferably made of a material of a sterilization-damage-resistant type capable of being sterilized without damage, either by means of heat or various other strelization procedures and techniques.

It should also be noted that while the exemplary dental string loop 14 is shown as having a knot 31 joining a short length of the string into the desired loop form, the invention is not specifically so limited, and the dental string loop 14 may be formed in one continuous loop without a knot, or may be effectively joined together in any suitable manner either at the time of initial manufacture or subsequently by mechanized processing of a length of dental string, or otherwise.

Furthermore, it should be noted that the dental string loop 14 may be made of any suitable material, such as any of the conventional thread materials, woven multifilament plastic material, monofilament plastic material, metallic wire material, or any other suitable material and, in certain cases, may be impregnated or covered with various additive materials, either for lubrication purposes (such as wax or the like), gum protection purposes, germicidal or disinfectant purposes, styptic or other desired purposes.

It should also be noted that the entire instrument may be made of various materials such as plastic, metal, wood, or any other material suitable to the purpose of the present invention.

It should also be noted that the particular type of tension adjustment means and the slidable mounting thereof may be modified substantially within the broad spirit and scope of the present invention.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A tooth cleaning instrument adapted to mount a short closed tensile member loop of dental string in a tension-adjustable manner and in a position for effective use in forcing same between adjacent teeth for removal of food particle debris therefrom, comprising: a longitudinal handle member provided with substantially transversely directed bifurcated yoke means at a front end thereof, said bifurcated yoke means comprising a pair of transversely directed, substantially parallel fingers separated by a substantially rectangular opening and spaced apart in a direction substantially perpendicular to the transverse length direction of each of said fingers whereby to cause said transversely directed bifurcated yoke means to be of a substantially rectangular U-shaped configuration, each of said transversely directed fingers being provided with inwardly grooved, transversely directed guide channel means along the complete transverse lengths of the outer edges thereof and being additionally provided with perpendicularly communicating, laterally aligned, rearwardly grooved, inwardly directed guide channel means completely along the inwardly directed front end edges of each of said spaced fingers, said guide channel means being cooperable to receive therein corresponding side and front portions of a short closed tensile member loop of dental string with a front tooth cleaning portion thereof being adapted to lie laterally across the front edge of the substantially rectangular opening between the parallel laterally spaced fingers of said substantially rectangular U-shaped bifurcated yoke means in a position for effectively using same by forcing same between adjacent teeth for removal of food particle debris therefrom; and manually controllably slidably operable longitudinal tension adjustment means carried by the back outer side of said longitudinal handle member and having a forwardly positioned, outwardly directed engagement hook means cooperable for engagement with a rear portion of a short closed tensile member loop of dental string for manually caused slidable movement thereof and for corresponding adjustment of the tension of a front tooth cleaning portion of a short closed tensile member loop of dental string, said manually controllably slidably operable tension adjustment means comprising a longitudinal slide member having said engagement hook means at the forward end thereof and extending outwardly away from the adjacent surface of the longitudinal handle member and having a similarly outwardly extending, manually engageable projection at the rear end of said longitudinal slide member, and being provided with pin-in-slot longitudinal slidable mounting and constraint means effectively longitudinally slidably coupling and mounting said longitudinal slide member to the adjacent back outer surface of said longitudinal handle member on the opposite side thereof from the transversely directed bifurcated yoke means, said pin-in-slot longitudinal slidable mounting means comprising a pair of longitudinally spaced, transversely directed rivets rigidly carried by said longitudinal handle member in outwardly extending and directed relationship and a pair of longitudinally directed, aligned, and longitudinally spaced slot-defining portions provided in said longitudinal slide member of said tension adjustment means slidably receiving corresponding shank portions of said two rivets therein and extending outwardly therethrough, said two rivets having enlarged outer heads wider than the slots defined by said slot-defining portions of said slide member and being positioned outwardly thereof in a manner positively retaining and mounting said slide member in said longitudinally slidable relationship with respect to said outer back surface of said longitudinal handle member; said longitudinal handle member, said transversely directed yoke means, and said tension adjustment means being made of a material of a sterilization-damage-resistant type capable of being sterilized without damage.

2. A tooth cleaning instrument as defined in claim 1, wherein said sterilization-damage-resistant type of material of which said longitudinal handle member, said transversely directed yoke means, and said tension adjustment means are made comprises a molded plastic material of a heat-resistant type capable of being heat-sterilized without damage thereto.

3. A tooth cleaning instrument adapted to mount a short closed tensile member loop of dental string in a tension-adjustable manner and in a position for effective use in forcing same between adjacent teeth for removal of food particle debris therefrom, comprising: a longitudinal handle member provided with substantially transversely directed bifurcated yoke means at a front end thereof, said bifurcated yoke means comprising a pair of transversely directed, substantially parallel fingers separated by a substantially rectangular opening and spaced apart in a direction substantially perpendicular to the transverse length direction of each of said fingers whereby to cause said transversely directed bifurcated yoke means to be of a substantially rectangular U-shaped configuration, each of said transversely directed fingers being provided with inwardly grooved, transversely directed guide channel means along the complete transverse lengths of the outer edges thereof and being additionally provided with perpendicularly communicating, laterally aligned, rearwardly grooved, inwardly directed guide channel means completely along the inwardly directed front end edges of each of said spaced fingers; a short closed tensile member loop of dental string; said guide channel means receiving and mounting therein corresponding side and front portions of said short closed tensile member loop of dental string with a front tooth cleaning portion thereof lying laterally across the front edge of the substantially rectangular opening between the parallel, laterally spaced fingers of said substantially rectangular U-shaped bifurcated yoke means in a position for effectively using same by forcing same between adjacent teeth for removal of food particle debris therefrom; and manually controllably slidably operable longitudinal tension adjustment means carried by the back outer side of said longitudinal handle member and having a forwardly positioned, outwardly directed engagement hook means normally in hooked engagement with a rear portion of said short closed tensile member loop of dental string for manually caused slidable movement thereof and for corresponding adjustment of the tension of said front tooth cleaning portion of said short closed tensile member loop of dental string, said manually controllably slidably operable tension adjustment means comprising a longitudinal laterally flat slide member having said engagement hook means at the forward end thereof and extending outwardly away from the adjacent surface of the longitudinal handle member and having a similarly outwardly extending, manually engageable projection at the rear end of said longitudinal slide member, and being provided with pin-in-slot longitudinal slidable mounting and constraint means effectively longitudinally slidably coupling and mounting said longitudinal slide member to the adjacent back outer surface of said longitudinal handle member on the opposite side thereof from the transversely directed bifurcated yoke means, said pin-in-slot longitudinal slidable mounting means comprising a pair of longitudinally spaced, transversely directed rivets rigidly carried by said longitudinal handle member in outwardly extending and directed relationship and a pair of longitudinally directed, aligned, and longitudinally spaced slot-defining portions provided in said longitudinal slide member of said tension adjustment means slidably receiving corresponding shank portions of said two rivets therein and extending outwardly therethrough, said two rivets having enlarged outer heads wider than the slots defined by said slot-defining portions of said slide member and being positioned outwardly thereof in a manner positively retaining and mounting said slide member in said longitudinally slidable relationship with respect to said outer back surface of said longitudinal handle member; said longitudinal handle member, said transversely directed yoke means, and said tension adjustment means being made of a material of a sterilization-damage-resistant type capable of being sterilized without damage.

4. A tooth cleaning instrument as defined in claim 3, wherein said sterilization-damage-resistant type of material of which said longitudinal handle member, said transversely directed yoke means, and said tension adjustment means are made comprises a molded plastic material of a heat-resistant type capable of being heat-sterilized without damage thereto.

References Cited by the Examiner
UNITED STATES PATENTS

| | | | |
|---|---|---|---|
| 1,346,125 | 7/1920 | Hasbrook | 132—92 |
| 1,364,367 | 1/1921 | Goodrich | 132—91 |
| 2,840,081 | 6/1958 | Moose | 128—303 |
| 2,840,082 | 6/1958 | Salvatore | 128—303 |
| 2,873,749 | 2/1959 | Gjerde | 132—91 |
| 3,038,468 | 6/1962 | Raeuchle | 128—20 |

FOREIGN PATENTS

| | | |
|---|---|---|
| 644,176 | 5/1928 | France. |
| 522,909 | 4/1931 | Germany. |

RICHARD A. GAUDET, *Primary Examiner.*